April 8, 1924. Re. 15,813

McCLELLAN A. KUHN ET AL

PACKING SERVICE APPARATUS

Original Filed March 29, 1922 6 Sheets-Sheet 1

Inventors,
M. A. Kuhn,
F. Steblen,
By Acker & Fallon
Attorneys.

April 8, 1924. Re. 15,813

McCLELLAN A. KUHN ET AL

PACKING SERVICE APPARATUS

Original Filed March 29., 1922 6 Sheets-Sheet 2

Inventors.
M. A. Kuhn
F. Stebler
By Asher + Toller
Their Attorneys.

April 8, 1924. Re. 15,813

McCLELLAN A. KUHN ET AL

PACKING SERVICE APPARATUS

Original Filed March 29, 1922 6 Sheets-Sheet 3

Inventors,
M. A. Kuhn
F. Stebler,
By Acker + Joltes
Attorneys

April 8, 1924. Re. 15,813

McCLELLAN A. KUHN ET AL

PACKING SERVICE APPARATUS

Original Filed March 29, 1922 6 Sheets-Sheet 4

Inventors,
M. A. Kuhn
F. Stebler
By Acker + Joeter
their attorneys.

April 8, 1924. Re. 15,813

McCLELLAN A. KUHN ET AL

PACKING SERVICE APPARATUS

Original Filed March 29, 1922 6 Sheets-Sheet 5

Inventors.
M. A. Kuhn,
F. Stebler
By Archer & Salter
Their Attorneys.

April 8, 1924. Re. 15,813

McCLELLAN A. KUHN ET AL

PACKING SERVICE APPARATUS

Original Filed March 29, 1922 6 Sheets-Sheet 6

Inventors,
M. A. Kuhn,
F. Stebler
By Acker & Salter
Their Attorneys.

Reissued Apr. 8, 1924. Re. 15,813

UNITED STATES PATENT OFFICE.

McCLELLAN A. KUHN, OF PORTERVILLE, AND FRED STEBLER, OF RIVERSIDE, CALIFORNIA, ASSIGNORS TO STEBLER-PARKER-KUHN CO., OF RIVERSIDE, CALIFORNIA, A CORPORATION OF DELAWARE.

PACKING-SERVICE APPARATUS.

Original No. 1,439,825, dated December 26, 1922, Serial No. 547,745, filed March 29, 1922. Application for reissue filed October 2, 1923. Serial No. 666,200.

*To all whom it may concern:*

Be it known that we, McCLELLAN A. KUHN and FRED STEBLER, citizens of the United States, residing the said KUHN at Porterville, in the county of Tulare and State of California, and the said STEBLER at Riverside, in the county of Riverside, State of California, have invented certain new and useful Improvements in Packing-Service Apparatus, of which the following is a specification.

The hereinafter described invention is designed for use in connection with the fruit packing industry, and is utilized for bringing boxes of unsorted fruit to sorting stations where they are removed by operators known as sorters for the sorting of the fruit contained therein; the construction of the apparatus being such that a line of boxes containing unsorted fruit is constantly maintained at the sorting stations, the various sorting stations being automatically maintained filled on the removal of one or more boxes from the line of sorting stations, the feed means for the boxes being intermittently thrown into operative relation the moment a box of unsorted fruit is removed from a sorting station for sorting purposes. In other words, the removal of an unsorted box of fruit throws into action the means for allowing another box to take its place.

The boxes as brought in from the orchards contain fruit indiscriminately mixed as to sizes and grades, and it is required that the fruit be sorted to remove the imperfect and undersized specimens prior to packing for shipment.

The principal object of our invention is to provide an apparatus by the use of which the sorting and packing of the commodities will be greatly facilitated, in that the boxes of fruit to be sorted are automatically fed to the individual receiving stations, as fast as boxes are removed therefrom by the packers for sorting purposes.

Our invention consists in an apparatus employing preferably a straight conveyor of considerable length, over which the unsorted boxes are fed from one end, with stations provided for the packers or sorters on each side throughout its length, whereby considerable labor and time is saved by eliminating the necessity for the unsorted box handlers having to keep watch over the whole length of the device and place the boxes directly at the points where the individual packers or sorters are located.

Another object of the invention is to provide means for automatically regulating the travel of the unsorted boxes along the device; that is, if the conveyor for the entire length of the machine is filled, the movement of the boxes will automatically discontinue, while as soon as any one box of the series of boxes is removed to be sorted, the travel or feeding of the boxes is automatically resumed, so as to fill the space rendered vacant by the removal of the box; a further object being to arrange, in connection with the various sorting and packing stations, means for conveying the culls and other fruit not suitable for packing to a predetermined point from all the packing stations, and separate means for returning the initial boxes after being emptied, to another predetermined point, with but very little work and effort on the part of the packers or sorters being necessary, and to produce a simple and inexpensive device and yet one which will be exceedingly effective for the purposes for which it is designed.

In order to comprehend the invention reference should be had to the accompanying sheets of drawings illustrative of a preferred embodiment of an apparatus for the practical carrying out of the invention, and wherein:—

In carrying out of our invention, we employ a structure which comprises a suitable and substantial supporting frame, consisting essentially of longitudinal, spaced and parallel beams 1, connected at intervals by cross ties or beams 2, and supported from the floor by standards 3. These members, as above stated, form the essentials of a supporting frame, such bracing being used in addition as will make a structure rigid and substantial enough to stand up under the fairly heavy loads and work to which it is subjected.

Figure 5:
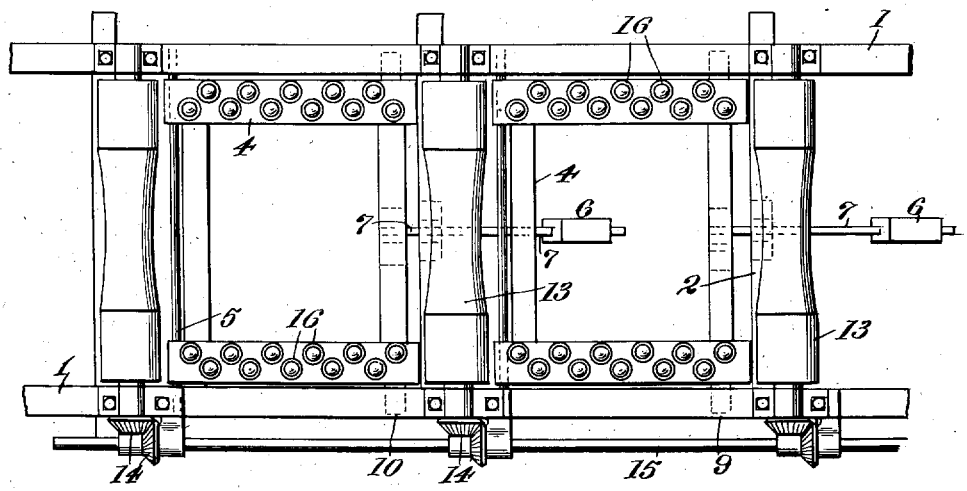
Figure 5 is a broken detail top plan view of a portion of the box receiving runway, with certain of the co-operating mechanism disclosed.
Figure 6:
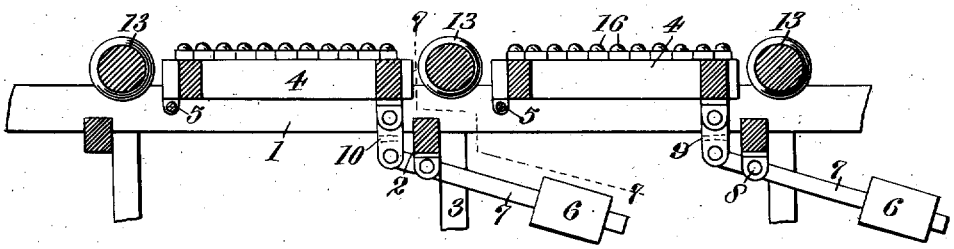
Figure 6 is a longitudinal sectional elevation of the mechanism disclosed by Fig. 5 of the drawings.
Figure 7:
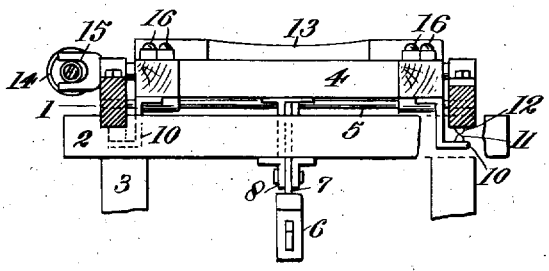
Figure 7 is a transverse sectional view, taken on the irregular line 7—7 of Fig. 6.

Positioned between the beams 1 at spaced intervals throughout the length of the apparatus are provided box receiving platforms or stations 4, each one being pivotally mounted at one end to the beams as at 5, Figs. 5, 6 and 7 of the drawings, at the end of the station opposite to the forward end of the line of stations, the opposite ends of the platforms being free for limited vertical movement, and each platform being of a size to receive a box of unsorted fruit thereon.

Normally these platforms 4 are held on a level and horizontal plane by means of counterweights 6, Figs. 5 and 6 of the drawings, mounted on arms 7 which are pivoted intermediate their ends to the transverse beams 2 as at 8, while the ends of said arms opposite to the weights thereon are pivotally linked as at 9 to the free ends of the platforms, it being understood that the platforms 4 are mounted independent of each other. The platforms 4 are prevented from rising above a horizontal level by means of brackets 10 fixed thereon adjacent their free ends, (see Fig. 7) which project under the longitudinal beams 1, one of each pair of brackets 10 carrying a contact 11 adapted to bear against a similar contact 12 fixed on one of the longitudinal beams 1, when the platform is in its raised position, the purpose of these contacts and the parts co-operating therewith being set forth hereinafter.

Journaled onto the beams 1 at spaced intervals and extending between all the platforms are rollers 13, which are arranged to be rotated simultaneously as through the medium of gearing 14 driven from a common shaft 15, Figs. 1, 2, 3 and 5 of the drawings.

The rollers 13 rotate in a counter clockwise direction when looking from the front to the rear end of the line of box receiving stations, so as to feed boxes onto the various platforms and move them along from the forward toward the rear end of the line of stations. The upper faces of these rollers are above the top of the platforms 4, which have a plurality of anti-friction box-supporting elements extending longitudinally thereon, and situated in a plane slightly below the top of the rollers 13.

Figure 8:
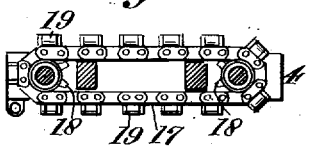
Figure 8 is a longitudinal and detached section of a platform or station, illustrating a form of anti-friction box supporting means thereon.

These anti-friction members 16 are preferably in the form of ball-casters 16, Figs. 1, 2, 3, 5, and 6 of the drawings, this type being very substantial, and allowing for easy movement of a box both longitudinally of the box supporting platforms 4 and transversely thereof, when it is desired to pull a box from a platform sideways. However, any suitable forms of anti-friction supporting means may be used, as for instance the type shown in Fig. 8 of the drawings, which consists of endless chains 17 extending longitudinally of the platforms in spaced relation and mounted on sprockets 18 journalled in the platforms. Projecting outwardly of and mounted on the chains are rollers 19 whose axes extend longitudinally of the platforms 4 and which sustain the weight of the boxed supplies. When a box is moved onto the platform 4 impelled by the adjacent roller, the chain moves lengthwise thereof, the sprockets rotating, while when a box is to be removed by pulling the same sideways, the rollers revolve while the chains remain stationary.

Figure 15:
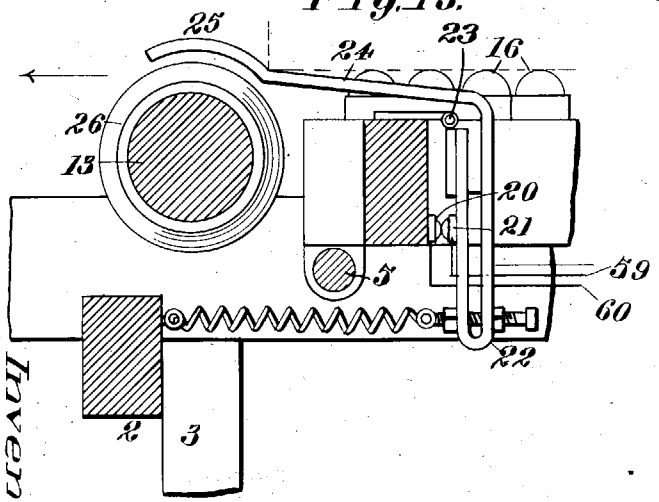
Figure 15 is an enlarged fragmentary view illustrating a section of a box receiving station, a box feed driven roller associated therewith, and showing an electrical contact mechanism for the purpose hereinafter specified.

Certain of the platforms 4, preferably every fifth one—has adjacent its pivoted end a contact 20, normally engaged by a contact 21 mounted on a bar 22 hinged to the platform 4, as shown at 23 in Fig. 15.

Figure 1:
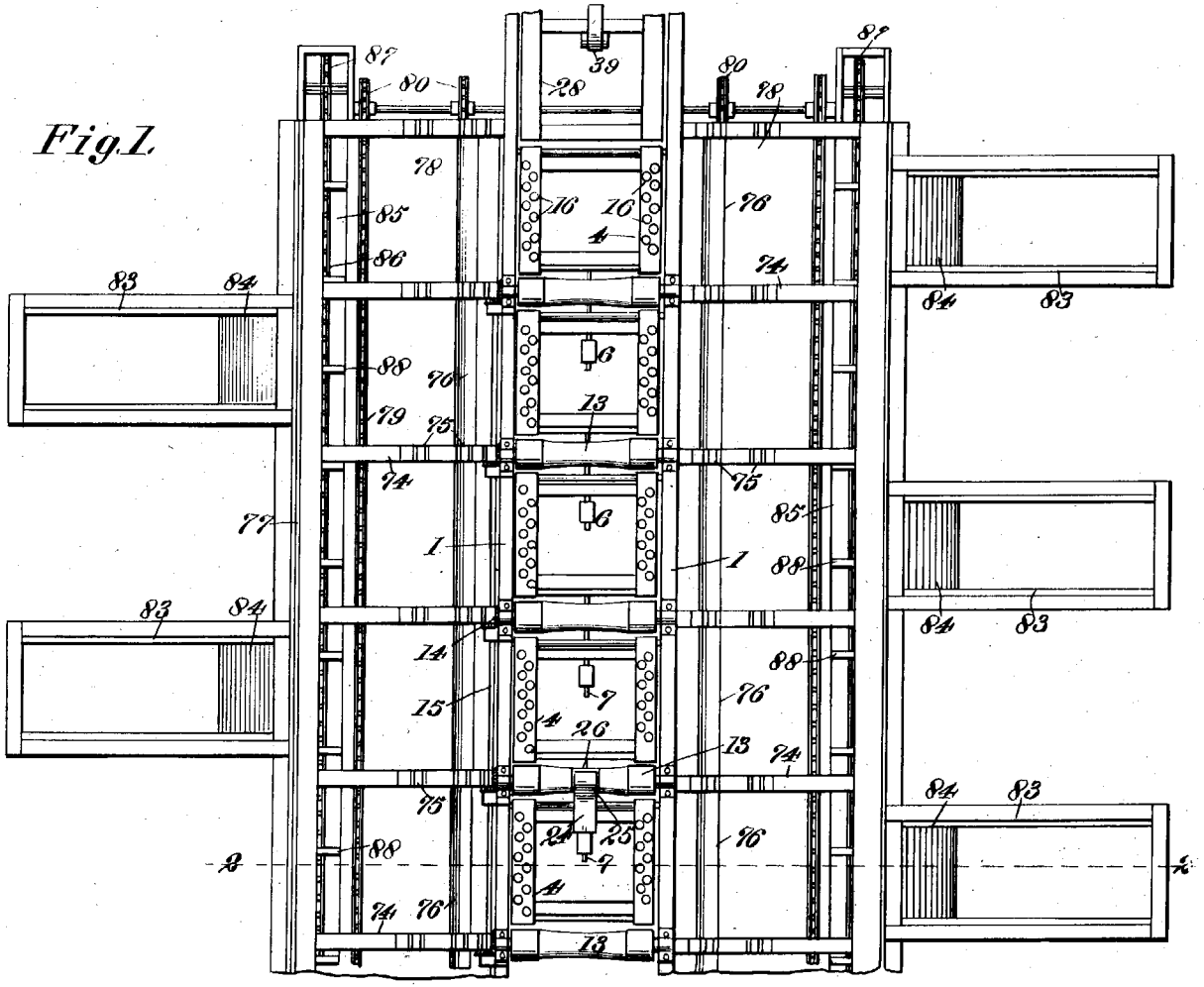
Figure 1 is a broken top plan view of a portion of an apparatus for carrying out of the invention, taken adjacent the rear end thereof.

Fixed to or formed with the bar 22 is an arm 24, which projects above the hinge member and toward and over the adjacent roller 13, Figs. 1 and 15 of the drawings. As far as said roller, the arm is below the level of the roller and casters, but beyond that point the arm is curved upwardly as at 25 so as to be above the level of the roller 13, and to be then engaged by the bottom edge of a box moving toward said roller. The curved portion of the arm 24 will then be depressed, the box passing thereover, and said portion will then rest in a depression 26 cut circumferentially in the roller 13. Since the arm 24 is rigid with the bar 22, the latter will then be turned on its hinge, separating the contacts 20 and 21 for the purpose as will appear. The contacts are normally held engaged, and restored to that position by the tension of the adjustable spring means 27 when the load is taken off the member 25.

Figure 16:
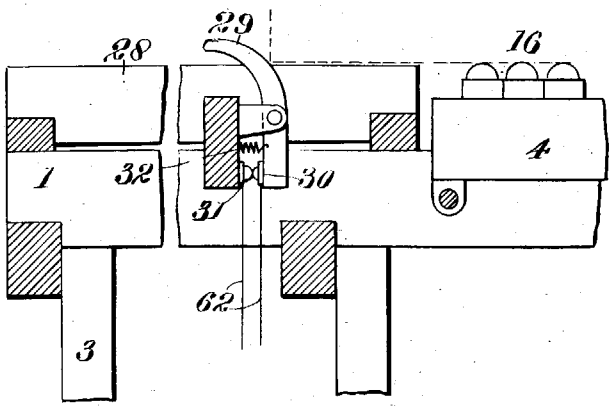
Figure 16 is a similar view of the rearmost station and the box-receiving skids therebeyond, showing an electrical contact mechanism arranged between the skids for the purpose hereinafter explained.

There are no transversely disposed rollers 13 situated beyond the rearmost platform 4 of the series of platforms, but skids 28 supported by the beams 1, Figs. 1 and 16 of the drawings, are placed therebeyond to receive any boxes in the event that the system for any reason, due to a broken box or otherwise, should fail to function and halt the travel of the boxes at the last station, as hereinafter described.

Mounted between the skids 28 (see Figs. 1 and 16) is a pivoted arm 29, the upper end of which projects above the said skids, while the lower end thereof has a contact 30 normally held in engagement with a fixed contact 31 by spring means 32, the breaking of these contacts by a box engaging and depressing the upper end of the arm 29 positively stopping the travel of the boxes, as will be seen.

The boxes are fed onto the line of stations or platforms in single file and from the forward end of the system by means of an elevator 33 (see Fig. 3) which preferably consists of an endless chain and cross-cleat structure 34 of any standard design.

Figure 9:
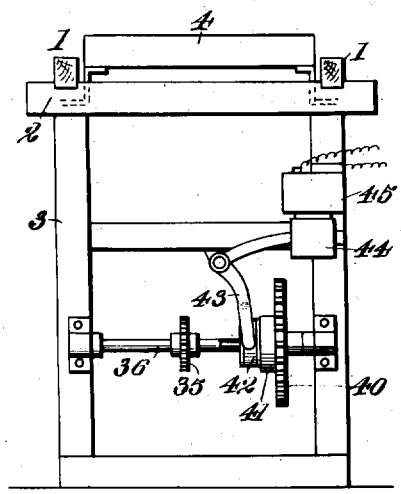
Figure 9 is a detail end view illustrating an electrically operated clutch mechanism situated at a platform sorting station for actuating the shaft which controls the driving of the feed elevator for the boxes containing the unsorted fruit.

This conveyor is preferably driven from a sprocket 35 mounted on a shaft 36 (see Figs. 3 and 9), an endless chain 37 around said sprocket driving a jackshaft 38, from which the upper conveyor shaft 34[a] is directly driven. The jackshaft here shown is merely used for convenience of arrangement, and can be omitted, if desired.

The shaft 36 is adapted to be driven from a main drive shaft 39, preferably driven by an electric motor (not shown). From this shaft an operative and driving connection is had with a sprocket wheel 40 mounted loosely on the shaft 36, with which sprocket wheel one member 41 of a clutch is formed or fixed thereon. The co-operating member 42 of this clutch is slidably splined onto the shaft 36. The clutch operating arm 43, in the type of mechanism shown in Fig. 9, has a weight 44 on its upper end adapted to be raised by an electrically energized magnet 45, the parts being so arranged that when the magnet is energized the clutch is thrown in and the shaft 36 will turn, driving the elevator 33.

Figure 3:
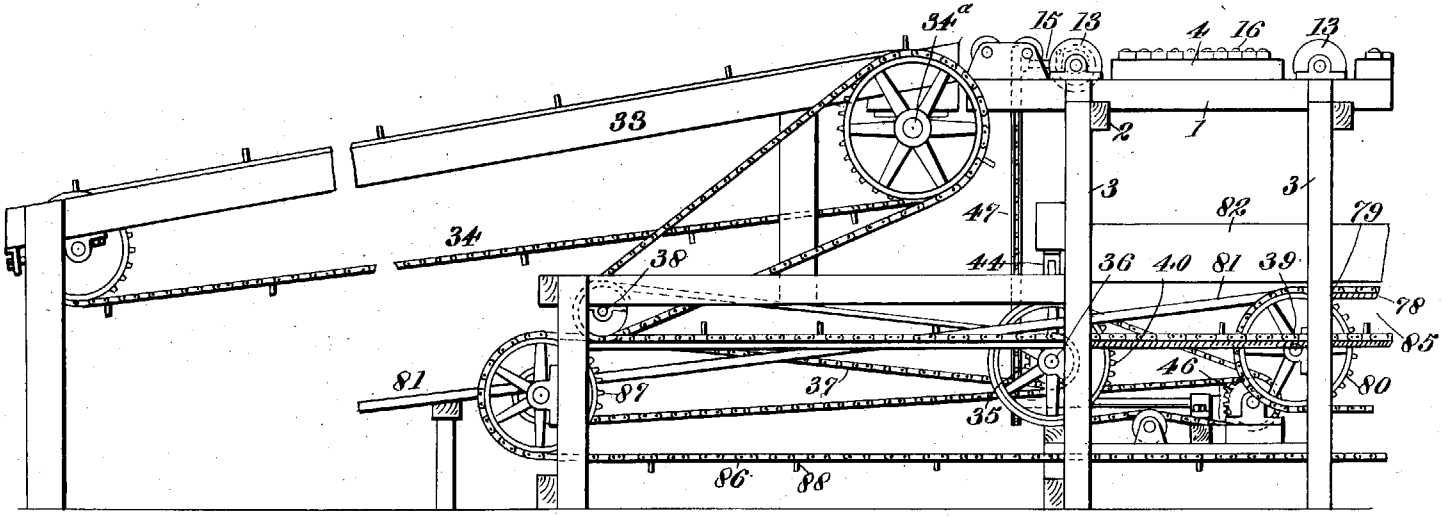
Figure 3 is a broken detail view in side elevation taken at the forward or feed end of the apparatus, illustrating the driving mechanism, the feed means for the unsorted boxes, the sorting table at the side, the sides for the cull and empty box conveyors being removed.

The roller-drive shaft 15 is driven continuously from the shaft 39 by suitable gear and chain means as shown at 46 and 47 respectively, Fig. 3 of the drawings.

It will be understood that while we have specifically designated various forms of drive for the transmission mechanisms, any other suitable devices for transmitting the power to the various driven members and at the proper relative speeds may be used.

Figure 14:
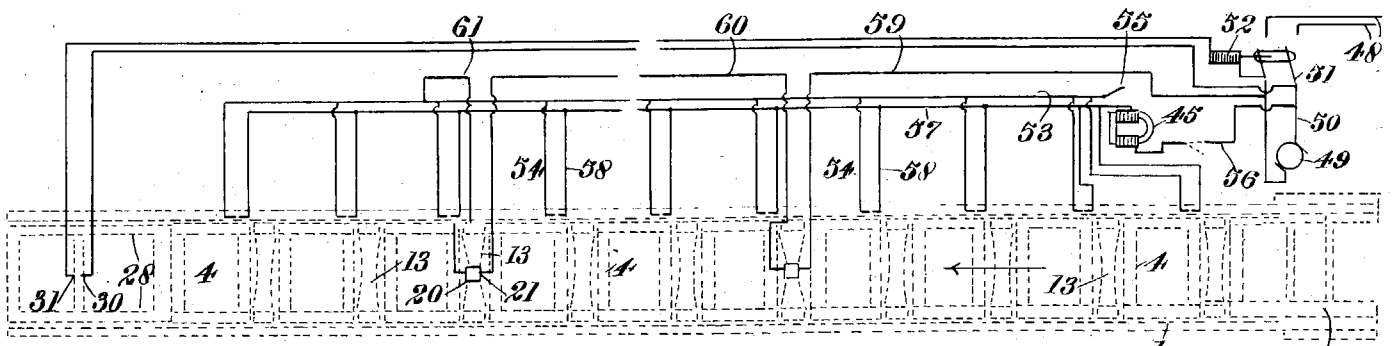
Figure 14 is a diagram of the electrical motor and clutch circuits preferably used in my device.

For an outline of the circuits employed between the clutch-magnet and motor, and the various contacts heretofore described, reference should be had to Fig. 14 of the drawings.

In wiring up these circuits with a power line, normal voltage may be used for all contacts, or a high and low voltage system may be used. Since these are matters of electrical installation and adaptation, we have shown and will describe only the first named type.

The main power lines 48 lead directly to a motor 49 through wires 50, a switch 51 being interposed between the wires 48 and 50, this switch being connected with a no-voltage release structure conventionally illustrated at 52. For this purpose, we prefer to employ a "Trumbull" 3-pole switch, with no voltage release attachment. From one of the wires 50 a line 53 leads to the rearmost station-contact 12, while branches 54 lead from said wire to the other similar contacts.

Between the first station and the main line 50, a switch 55 is interposed, normally open.

From the other one of the wires 50 a wire 56 leads to the magnet 45, from the other pole of which a wire 57 leads to the rearmost movable station contact 11, there being branches 58 from said wire to all the other similar contacts, so that all the station contacts are wired in series.

A wire 59 leads from the wire 53 between the switch 55 and the feed wire 50 to the first contact 21 of the fifth station and roller structure, Fig. 15 of the drawings, another wire 60 leads from the adjacent contact 20 to the next contact 21, and so on to the end of the line of stations where the final wire 61 leads from the last contact 20 to the wire 53 adjacent thereto.

It will thus be seen from the foregoing arrangement that, owing to the normally open switch in the station-contact wiring, a circuit therethrough will only be closed when the current can pass through the wires 61, 60 and 59, the latter of which bridges the switch-gap.

It will also be borne in mind that it is only when this circuit is closed that the magnet will be energized, holding the clutch 41—42 thrown in and the box delivery elevator running.

In operation, it is assumed that the motor is running, and the box receiving stations all empty. This causes the contacts 11—12 to be made, causing the aforementioned clutch to be thrown in and the elevator to be operated.

The boxed supplies are then fed onto the elevator which carries them onto the line of stations, the driven rollers (which it will be remembered are not affected by any inoperation of the elevator but only of the motor) which impels them along the line of stations. As each box rests on a station, the weight becomes greater than the counterbalancing effect of the weights 6, and the station is depressed at its free end, breaking the contacts. It will be noted, however, that owing to the series form of wiring used, the contacts at all the stations must be broken before the circuit will be broken through the clutch-magnet and the elevator discontinued, while on the other hand, the engagement of any one pair of such contacts, had when a box is removed from a station, is sufficient to close the circuit and set the elevator in operation.

Now the object of the additional contacts at the fifth stations and rollers is this:—With the elevator running and boxes being fed continuously onto the line of box receiving stations, the boxes naturally abut one against the other and are pushed along in an unbroken line. Since each receiving station is approximately the length of a box, the extra and unavidable space occupied by the rollers between the stations does not rightly locate a box directly above each station under these conditions, as will be evident. It is to permit the boxes to be separated at intervals so as to allow them to rest squarely on a station that these fifth station contacts are employed.

When a box abuts against an arm 25, with the continued movement thereof the arm is depressed, at once breaking the contacts 20 and 21, which breaks the circuit through the magnet, causing the elevator to stop, regardless of the filled or unfilled condition of all the stations. The rollers however continue turning, causing what boxes are on the line of stations and resting on the rollers to be moved to the rear until they individually rest on the platforms, this inoperativeness of the elevator continuing as long as it takes the length of a box to pass over the roller having the arm 25 projecting thereover. As soon as the arm is released and the contacts re-made, the elevator will again start, provided all of the stations are not filled, which, as previously explained, automatically causes the circuit to be broken and the elevator to be discontinued.

Now regarding the contacts 30 and 31, at the rear end of the line of stations, these are connected to the no-voltage release structure 52 and to the wires 50 by means of wires 62, the contacts 30 and 31 being normally closed.

If the boxes should for any reason pass beyond the last station and on to the skids, the arm 39 will be depressed, breaking the contacts and breaking the no-voltage release circuit, causing the main switch 51 to be opened, stopping the motor, which not only stops the elevator but the rollers 13 as well.

It will be evident then that the only attention as to the feeding of supplies onto the stations is to keep the elevator loaded, since whenever a box is removed from any station of the series of stations, the feeding is instantly resumed to fill the vacancy.

Figure 10:
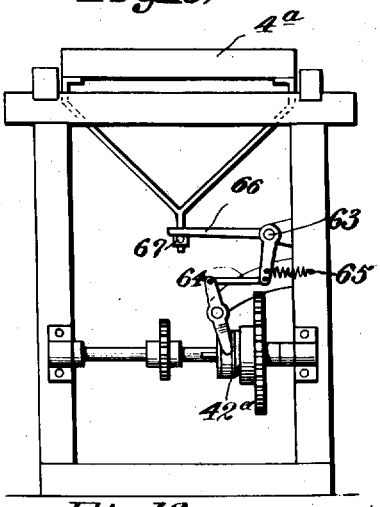
Figure 10 is a similar view, illustrating a modified mechanically operated clutch mechanism.

This electrically operated system is the one we prefer. However, referring to Fig. 10, a mechanically actuated clutch throwing mechanism may be used. In this structure, there is employed a longitudinal shaft 63 extending throughout the entire length of all the stations, and turnably mounted on the frame-work of the device. To one end of this shaft operative connections 64 are made with the clutch member $42^a$, which is normally held thrown out by spring means 65 or otherwise. Projecting outwardly from the shaft 63 under the free ends of all the stations $4^a$ are arms 66 which when the clutch is thrown in are held raised against the pull of the spring 65 by means of lugs or pins 67 projecting under the arms 66 and fixed on the lower ends of hangers 68 fixed onto the free ends of the platforms and depending therefrom. Now if the stations are all filled, the lugs 67 will be moved down and away from the arms 66, allowing the spring to act and throw out the clutch. The raising of any one lug, however, when a platform is emptied, is sufficient to raise the corresponding arm 66 and again cause the clutch to be engaged.

Figure 11:
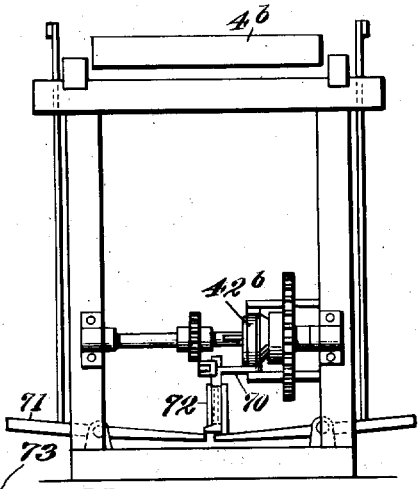
Figure 11 is a similar view, disclosing a foot-controlled means for operating the clutch mechanism.
Figure 12:
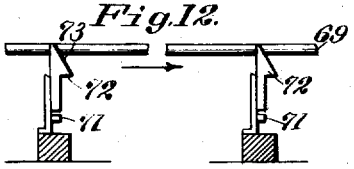
Figure 12 is a fragmentary detail view in side elevation of the shaft which controls the movement of the clutch shown in Fig. 11, together with the individual foot controlled means for actuating said shaft.
Figure 13:
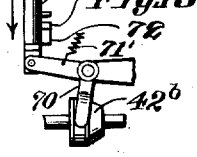
Figure 13 is a top plan view of the mentioned clutch, showing the connection between the same and the foot-controlled shaft.

Still another type of clutch control mechanism, shown in Figs. 11, 12 and 13, may be used. This type is manually controlled, the platforms $4^b$ being stationary. For this we employ a longitudinal shaft 69 under the line of stations, Figs. 12 and 13 of the drawings, which shaft is movable longitudinally. Said shaft is operatively connected with the clutch member $42^b$ as by a forked crank 70 normally held to throw the clutch out by spring means 71′. A foot lever 71, Fig. 11 of the drawings, is provided for each operator, adapted when depressed to engage and raise a wedge-shaped member 72, the wedge face of which engages a pin 73 projecting from the shaft 69, so that when any lever is depressed, the member 72 is raised, causing the shaft to be moved endwise for throwing in the clutch, this operation being done when a packer removes a box from a station, and keeping the lever down until its place is filled.

Figure 2:
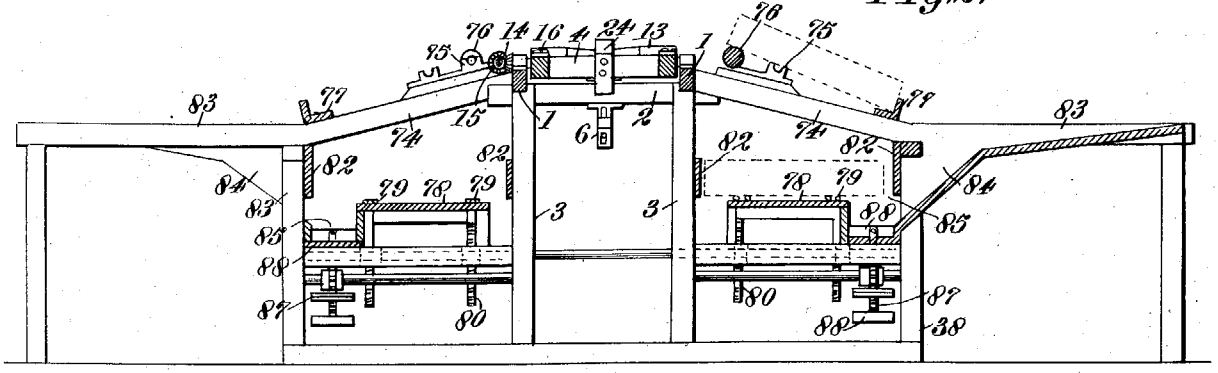
Figure 2 is a cross sectional view, taken on the line 2—2 of Fig. 1.
Figure 4:
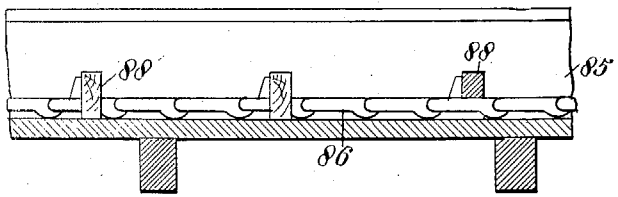
Figure 4 is a fragmentary and enlarged side view of a cull conveyor.

Referring to Figs. 1, 2, and 4, on each side of the structure and downwardly inclined therefrom between the stations are transversely disposed beams 74 supported at their outer ends by posts 3ª and on which, adjacent the upper ends thereof, are bearing blocks 75 in which are removably mounted rollers 76, whose upper faces are preferably about at the level of the station-casters 16. At the lower end of the beams 74 are provided racks 77, which extend the full length of the line of stations, any box drawn from a station being moved over the adjacent roller 76 until the outer end rests in the rack, while the opposite end will rest on the said roller, as shown in dotted outline in Fig. 2. Below the beams 74, and positioned between the rollers 76 and racks 77 is a flooring 78, on which travels an endless conveyer preferably comprising spaced and endless chains 79, mounted on sprocket wheels 80 at both ends of the line of stations, one set of said sprocket wheels being preferably mounted on the shaft 39, to be driven thereby (see Fig. 3).

Beyond one end of the endless conveyer is located a downwardly inclined skid board 81 on each side of the elevator 33, and which said board leads down to the floor, so as to deposit the empty boxes carried by the endless conveyer within reach of the field workers.

The boxes after being withdrawn laterally from the stations by the sorters are positioned and supported as above stated while the fruit is being removed therefrom and sorted and packed. The operator or sorter then deposits the empty box onto the conveyer just described, by raising up the end held by the rack, and drawing it toward him or away from the stations sufficiently for it to clear the roller 76. That end will then drop onto the conveyer, and he will then release the other end simultaneously. The boxes are prevented from missing the conveyer when so dropped by reason of guard boards 82 extending above the flooring 78 and fixed to the posts 3 and 3ª lengthwise of the device.

Beyond the beams 74 and arranged in staggered alinement on each side of the station structure are the assorting and packing tables 83, Figs. 1 and 2 of the drawings, which support the boxes to be packed. The floors of these tables are below the side walls thereof and in the form of inclined chutes 84, all those on each side leading down to a trough 85 extending longitudinally of the device and positioned between the empty box conveyer and the posts 3ª. The purpose of these chutes and troughs is to receive the culls, etc., removed from the box of unsorted fruit being handled by the packers or sorters.

The culls, when delivered to a trough, are moved along to a predetermined end thereof by means of a suitable conveyer here represented as an endless chain 86 mounted on sprockets 87, one of which is driven from the shaft 39 (see Fig. 3). Secured to the chain at intervals and extending transversely thereof and for the full width of the trough are cleats or scrapers 88 arranged to straddle the chain and rest on the floor of the chute, so as to sweep the culls along with the movement of the chain.

From the foregoing it will be noted that our apparatus comprises a plurality of alined sorting stations, independently disposed box receiving means associated with said stations, intermittently actuated mechanism for feeding boxes filled with unsorted fruit onto said receiving means, and devices for automatically controlling the action of the box feeding mechanism in accordance as to whether or not the series of receiving means are supplied with boxes of fruit to be sorted.

In the present case the apparatus is illustrated as a double sorter, that is provision is made for packers or sorters to operate from either side of the box runway, but such is merely a preferred construction of the apparatus for obtaining greater capacity as to operators and equally so to occupy less space than otherwise would be required to accommodate a corresponding number of operators or sorters.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:—

1. An apparatus for the described purpose, the same comprising a plurality of stations disposed in spaced longitudinal alinement, means for feeding supplies onto the stations from one end of the line, and means adapted when all the stations are filled to automatically discontinue the operation of the feeding means.

2. An apparatus for the described purpose, the same comprising a plurality of stations disposed in spaced continuous alinement, means for successively feeding supplies onto the stations from one end of the line, and means adapted when all the stations are filled to automatically discontinue the operation of the feeding means and to cause the operation thereof when any one station is unoccupied.

3. An apparatus for the described purpose, the same comprising a plurality of spaced independent stations disposed in longitudinal alinement, driven rollers between the stations, means for successively feeding supplies in boxes onto the rollers at one end of the line of stations, whereby the rollers will then assume the load and continue moving the boxes down the line, each station being adapted to receive a box thereon, and means adapted when all the stations are filled to automatically discontinue the operation of the feeding means and to cause the operation thereof when any one station is unoccupied.

4. An apparatus for the described purpose, the same comprising a plurality of stations disposed in spaced alinement, means for successively feeding supplies onto the stations from one end of the line, and means interposed between the stations for automatically and intermittently moving said supplies along the line of stations.

5. An apparatus for the described purpose, the same comprising a plurality of independent stations disposed in spaced alinement, each station being of a size to hold a box of supplies thereon, a driven conveyer structure arranged to deliver the boxes onto the line of stations at one end thereof, a clutch mechanism normally engaged interposed between the driving means of the conveyer and said conveyer, and operative connections between the stations and the clutch for releasing the latter when all the stations are occupied.

6. An apparatus for the described purpose, the same comprising a plurality of independent stations disposed in longitudinal alinement, each station being of a size to hold a box of supplies thereon, a driven conveyer structure arranged to deliver the boxes onto the line of stations at one end thereof, a clutch mechanism normally engaged interposed between the driving means of the conveyer and said conveyer, and operative connections between the stations and the clutch for automatically releasing the latter when all the stations are occupied, and for causing the clutch to be thrown in to drive the conveyer when any one station is unoccupied.

7. An apparatus for the described purpose, the same comprising a plurality of independent stations disposed in longitudinal alinement, a driven conveyer structure arranged to deliver the boxes onto the line of stations at one end thereof, a clutch mechanism normally engaged interposed between the driving means of the conveyer and said conveyer, electrical means for operating the clutch, circuit means for said operating means, said circuit being normally closed to hold the clutch thrown in, and means for automatically breaking the circuit only when all the stations are filled.

8. An apparatus for the described purpose, the same comprising a plurality of stations disposed in alinement, mechanism for delivering boxes successively onto the line of stations, clutch mechanism normally engaged interposed between the driving means of the conveyer and said conveyer, electrical means for operating the clutch, circuit means for said operating means, said circuit being normally closed to hold the clutch thrown in, and means for automatically breaking the circuit only when all the stations are filled, and for similarly closing the circuit when any one station is unoccupied.

9. An apparatus for the described purpose, the same comprising a plurality of stations disposed in longitudinal alinement, a conveyer arranged to deliver the boxes successively onto the line of stations, means for driving said conveyer, a clutch mechanism normally engaged interposed between the driving means and the said conveyer, and means for actuating the clutch mechanism when all the stations are occupied.

10. An apparatus for the described purpose, the same comprising a plurality of box receiving stations disposed in longitudinal alinement, a driven conveyer structure arranged to intermittently deliver boxes onto the line of stations, a clutch mechanism normally engaged interposed between the driving means of the conveyer and said conveyer, means for operating said clutch, and means interposed between each station and said operating means whereby the latter will be moved to release the clutch only when all the stations are filled and to engage the clutch when any one station becomes unoccupied.

11. An apparatus for the described purpose, the same comprising a plurality of end to end box receiving stations disposed in longitudinal alinement, a driven conveyer structure arranged to deliver the boxes onto the line of stations from one end of the apparatus, clutch mechanism normally engaged interposed between the driving means of the conveyer and said conveyer, means for operating said clutch at predetermined times, means between each station and said operating means for throwing the clutch out when the stations are occupied, and re-engaging the clutch when the stations are unoccupied.

12. An apparatus for the described purpose, the same comprising a plurality of stations disposed in end to end alinement, a driven conveyer structure arranged to deliver the boxes onto the line of stations from one end of the apparatus, clutch mechanism normally engaged interposed between the driving means for the conveyer and said conveyer, means for operating said clutch and means between each station and said operating means and arranged to automatically cause the release of the clutch when all the stations are occupied and to similarly cause the re-engagement of the clutch when any one station becomes unoccupied.

13. An apparatus for the described purpose, the same comprising a plurality of alined box receiving stations, a driven roller between each station, a driven conveyer means for feeding boxed supplies onto the roller at one end of the line of stations, and means for automatically discontinuing the operation of the conveyer when a box is passing over certain of said rollers.

14. An apparatus for the described purpose, the same comprising a plurality of box receiving stations, a driven roller between each station, a driven conveyer means for feeding boxed supplies onto the roller at one end of the line of stations, clutch means interposed in the conveyer drive, said clutch being normally thrown in, and means whereby said clutch will be disengaged when a box is passing over certain ones of said rollers.

15. An apparatus for the described purpose, the same comprising a plurality of box receiving stations, a driven conveyer structure arranged to deliver the boxes onto the line of stations at one end thereof, clutch mechanism normally engaged interposed between the driving means of the conveyer and said conveyer, electrically operated means for actuating the clutch, a normally closed circuit for holding the clutch thrown in, and switch means in the circuit at each station adapted to be closed only when a station is unoccupied.

16. An apparatus for the described purpose, the same comprising a plurality of box receiving stations, a driven conveyer structure arranged to deliver the boxes onto the line of stations, clutch mechanism normally engaged interposed between the driving means for the conveyer and said conveyer, electrical means for operating the clutch, circuit means for said operating means, said circuit being normally closed to hold the clutch thrown in, switch means in the circuit at each station and adapted to be closed when the station is unoccupied and opened when the station is filled, and means whereby the switches are actuated to throw out the clutch and adapted on the closing of one switch to re-engage the clutch.

17. An apparatus for the described purpose, the same comprising a plurality of box receiving stations, a driven roller between each station, driven conveyer means for feeding boxed supplies successively onto the said rollers, clutch means interposed in the conveyer drive, said clutch being normally thrown in, electrical means for actuating the clutch, a circuit for said means, and switch means in the circuit at certain of said rollers and adapted to be opened by a box passing over any of said rollers, whereby the clutch will be thrown out.

18. An apparatus for the described purpose, the same comprising a plurality of platforms arranged in alinement, pivoting means for each platform at one end thereof the platforms being free for limited vertical movement about their pivotal connections, and means associated with each platform arranged to hold the free end thereof in a raised position when the platform is unoccupied and to allow the same to swing downward when the platform is loaded.

19. An apparatus for the described purpose, the same comprising a plurality of spaced box receiving platforms arranged end to end in longitudinal alinement, each platform being adapted to receive and support a box, driven rollers between the platforms, means for successively feeding of boxes onto the line of platforms, friction reducing means on the platforms to permit free movement of the boxes thereover from one roller to the other, and means adapted when all the stations are filled to automatically discontinue the operation of the feeding means and to cause the operation thereof when any one station is unoccupied.

20. An apparatus for the described purpose, the same comprising a plurality of box receiving platforms arranged in end to end alinement, each platform being adapted to receive and support a box, means for successively feeding of boxes onto the line of platforms, friction reducing members on the platforms arranged to allow free movement of the boxes over the platforms both lengthwise and transversely thereof, and means adapted when all the stations are filled to automatically discontinue the operation of the feeding means and to cause the operation thereof when any one station is unoccupied.

21. An apparatus for the described purpose, the same comprising a plurality of box receiving longitudinally disposed platforms, each platform being adapted to receive and support a box thereon, driven rollers interposed between the platforms, means for successively and intermittently feeding the boxes onto the line of platforms, and friction reducing means on which the boxes rest whereby to allow free movement of the boxes from one platform to the other; said means terminating slightly below the upper edge of the rollers.

22. An apparatus for the described purpose, the same comprising a plurality of box receiving longitudinally disposed platforms, each platform being adapted to receive and support a filled box thereon, driven rollers interposed between said platforms, means for the feeding of boxes onto the line of platforms, pivoting means for the platforms, and means whereby when a loaded box is on a platform the latter will settle at its free end and when the box is removed the platform will resume a raised position.

23. An apparatus for the described purpose, the same comprising a plurality of box receiving platforms arranged in alinement, driven rollers interposed between said platforms, means for the feeding of boxes onto the line of platforms, pivoting means for the platforms, means for normally holding the platforms in a raised position, clutch means for controlling the operation of the box feeding means, and independent connections between the movable platforms and the clutch means for causing the latter to be thrown out when all the stations are depressed and to be re-engaged when any one platform returns to its normal raised position.

24. An apparatus for the described purpose, the same comprising a plurality of pivotally held box receiving stations arranged in alinement, and spaced assorting stations projecting transversely of the line of receiving stations on both sides thereof, and automatically controlled mechanisms for intermittently delivering filled boxes to the receiving platforms.

25. An apparatus for the described purpose, the same comprising a plurality of box receiving stations arranged in spaced longitudinal alinement, spaced assorting stations projecting transversely of the line of receiving stations, a cull conveyer extending continuously of the assorting stations and thereunder, chutes leading from said stations to the conveyer, means for automatically and intermittently delivering filled boxes to the box receiving platforms, and means adapted when all the stations are filled to discontinue the operation of the feeding means and to cause the operation thereof when any one station is unoccupied.

26. An apparatus for the described purpose, the same comprising a plurality of spaced box receiving stations arranged in longitudinal alinement, spaced assorting stations projecting transversely of the line of receiving stations, a cull conveyer extending continuously of the assorting stations and thereunder and adapted to receive the culls from the assorting stations and separate empty-box conveyers under the assorting stations positioned above and inwardly of the cull conveyers, means for feeding filled boxes successively to the box receiving stations and means adapted when all the stations are filled to automatically discontinue the operation of the feeding means.

27. An apparatus for the described purpose, the same comprising a plurality of box receiving stations arranged in alinement, spaced assorting stations projecting transversely of the line of receiving stations, means for successively feeding filled boxes to the said stations, mechanism for advancing the boxes relative to said stations on the removal of a box therefrom, a conveyer for the removal of empty boxes, a conveyer for the removal of culls, and means adapted when all the stations are filled to automatically discontinue the operation of the feeding means and to cause the operation thereof when any one station is unoccupied.

28. An apparatus for the described purpose, the same comprising a plurality of box receiving stations arranged in alinement, each station being adapted to receive and hold a box of supplies, and spaced assorting stations projecting transversely of the line of receiving stations on both sides thereof, a cull conveyer extending continuously of the assorting stations and thereunder, said assorting stations comprising spaced beams sloping downwardly from the receiving stations, an empty box conveyer extending transversely under all the station beams, and box supporting racks on the beams above the conveyer, said racks comprising an angle shaped member, and a roller spaced therefrom, one end of the box resting in the angle member and the other on the roller, the latter being positioned nearest the upper end of the beams.

29. An apparatus for the described purpose, the same comprising a plurality of stations disposed in continuous alinement, each station being of a size to hold a box of supplies thereon, a conveyer for delivering said boxes to the line of stations at one end, rollers between the stations, an electric motor for driving the elevator and rollers, clutch means interposed in the driving connections between the motor and conveyer and normally thrown in, switch means for the motor normally closed, means at the stations for throwing out the clutch when any station is empty, and means at the rear end of the line of stations for opening the motor switch when a box passes beyond the rearmost station.

30. An apparatus for the described purpose, the same comprising a plurality of stations disposed in continuous alinement, each station being of a size to hold a box of supplies thereon, a conveyer for delivering said boxes to the line of stations at one end, rollers between the stations, an electric motor for driving the elevator and rollers, clutch means interposed in the driving connections between the motor and conveyer and normally thrown in, switch means for the motor normally closed, means at the stations for throwing out the clutch when any station is empty and electrical means for opening the motor switch actuated by a box when the latter passes beyond the rearmost station.

31. An apparatus for the described purpose, the same comprising a plurality of stations disposed in continuous alinement, each station being of a size to hold a box of supplies thereon, a conveyer for delivering said boxes to the line of stations at one end, rollers between the stations, an electric motor for driving the elevator and rollers, a no-voltage release switch for the motor normally closed, a circuit for said no-voltage release means normally closed, contacts in said circuit beyond the rearmost station, and means actuated by the passage of a box beyond said last station for breaking the contacts, whereby the switch will be opened and the motor circuit broken.

32. An apparatus for the described purpose, the same comprising a plurality of stations disposed in continuous alinement, each station being of a size to hold a box of supplies thereon, a conveyer for delivering said boxes to the lines of stations at one end, rollers between the stations, an electric motor for driving the elevator and rollers, a no-voltage release switch for the motor normally closed, a circuit for said no-voltage release means normally closed, contacts in said circuit beyond the rearmost station and a pivoted arm projecting above the line of the bottom of a box beyond said station, one of said contacts being fixed and the other one being on the lower end of the arm, the latter being free to move to break the contacts when a box moves against the upper end of the arm.

33. An apparatus for the described purpose, the same comprising a plurality of swinging box receiving stations disposed in alinement, each station being of a size to hold a box of supplies thereon, a conveyer for successively delivering said boxes to the line of stations, rollers interposed between the stations, an electric motor for driving the elevator and rollers, a switch for the motor, and means actuated by a box passing beyond the rearmost station for opening the switch.

34. An apparatus for the described purpose, the same comprising a plurality of stations disposed in continuous alinement, driven rollers between the stations, a driven conveyer means for feeding boxed supplies onto the lines of stations at one end, clutch means interposed in the conveyer drive, said clutch being normally thrown in, electrical means for actuating the clutch, a circuit for said means, means whereby the circuit will be broken and the clutch disengaged when all the stations are filled, and independent means for breaking the circuit at intervals in the length of the line of stations and for a predetermined period regardless of whether all the stations are occupied or not.

35. An apparatus for the described purpose, the same comprising a plurality of stations disposed in continuous alinement, driven rollers between the stations, a driven conveyer means for feeding boxed supplies onto the line of stations at one end, clutch means interposed in the conveyer drive, said clutch being normally thrown in, electrical means for actuating the clutch, a circuit for said means, means whereby the circuit will be broken and the clutch disengaged when all the stations are filled and independent means adjacent certain rollers for breaking the circuit regardless of whether all the stations are occupied or not and for the duration of the passage of a box over any one of said rollers.

36. An apparatus for the described purpose, the same comprising a plurality of independent vertically movable box receiving platforms or stations, a sorting station adjacent each thereof, mechanism for successively feeding filled boxes of unsorted fruit to the vertically movable platforms, and means for actuating said mechanism on the removal of a filled box from any one of said receiving platforms, and to stop the movement thereof on all the platforms being resupplied with filled boxes.

37. In an apparatus for the described purpose, the same comprising a frame structure, a plurality of alined receiving platforms for filled boxes of fruit, a plurality of sorting stations associated with the receiving platforms, feed mechanism for successively delivering boxes to said platforms, and interconnected associated working instrumentalities adapted to control the operative movement of the feed mechanism in accordance as to whether or not the said platforms are supplied with boxes.

38. In an apparatus for the described purpose, the same comprising a plurality of spaced independently movable box receiving platforms, intermittently operative feed mechanism for supplying filled boxes to said platforms, interconnected associated working instrumentalities for automatically controlling the operative movement of the feed mechanism in accordance as to whether said platforms are supplied with boxes, and means for throwing into action said working instrumentalities on the removal of a box from any one of the receiving platforms.

39. A packing service apparatus, the same comprising a longitudinally disposed frame structure provided with a runway for the movement thereover of boxes of fruit to be sorted, a plurality of sorting stations arranged in spaced relation throughout the length of the frame structure at the side thereof, a longitudinally disposed roller mounted adjacent the receiving end of the sorting stations for the withdrawal of boxes thereover, and means for successively advancing boxes of fruit over the frame structure and placing the same at a state of rest adjacent the respective sorting stations.

40. A packing service apparatus comprising a sorting table having within its runway a plurality of transversely disposed rollers arranged in spaced relation and adapted to support boxes of fruit as advanced through the runway, a plurality of sorting stations arranged at the side of the box runway in spaced relation throughout the length of the sorting table and a longitudinally disposed roller adjacent the receiving end of each sorting station and over which boxes of fruit are adapted to be withdrawn laterally from the sorting table.

41. A packing service apparatus comprising a sorting table provided with a box runway, a plurality of sorting stations arranged at the side of the runway in spaced relation, longitudinally disposed anti-frictional devices adjacent each sorting station over which boxes of fruit are adapted to be withdrawn laterally from the box runway, and means for advancing the boxes successively through the runway and bringing the same to a state of rest adjacent the respective sorting stations of the apparatus.

42. A packing service apparatus comprising a longitudinally disposed frame structure, a plurality of sorting stations arranged at the side of the frame structure in spaced relation, means within the frame structure adapted to advance filled boxes toward and place the same at a state of rest at the respective sorting stations, and anti-frictional means situated at the respective sorting stations for permitting withdrawal thereover laterally from the frame structure onto the sorting stations boxes containing fruit to be sorted.

43. In a packing service apparatus, the combination with a longitudinally disposed box runway provided with roller means for successively advancing boxes of fruit therethrough, of a plurality of sorting stations arranged in spaced relation at the side of the box runway, of means adjacent each sorting station for the lateral withdrawal of filled boxes from the runway onto the sorting stations, and means situated below and common to all of the sorting stations at one side of the fruit runway for receiving and returning empty boxes to a common place of deposit.

44. In combination with a packing service apparatus, of a longitudinally disposed box runway provided with transversely disposed rollers for supporting and advancing boxes of fruit to be sorted thereover, a plurality of sorting stations arranged at the side of the box runway in spaced relation, a table associated with each sorting station for receiving boxes to be filled, downwardly inclined members at each sorting station positioned intermediate the said table and the fruit runway for receiving boxes laterally withdrawn from the box runway and supporting the same while the fruit is being sorted, and means situated below said supporting members and common to all of the sorting stations at one side of the box runway for receiving empty boxes and returning the same to a suitable place of deposit.

45. A packing service apparatus comprising a longitudinally disposed box runway provided with means for intermittently advancing filled boxes therethrough, a plurality of sorting stations arranged at the side of the box runway in spaced relation, fixed members at each sorting station downwardly inclined from the box runway adapted to receive and support filled boxes laterally withdrawn from the box runway, a longitudinally disposed roller associated with said downwardly inclined members adjacent the upper end thereof and over which the boxes are moved as laterally withdrawn from the box runway, box supporting means associated with the downwardly inclined members for holding a filled box in position at the sorting station, and an endless conveyer mounted for travel beneath the sorting stations and in common with the series of sorting stations at the side of the box runway for receiving the empty boxes and delivering the same to a suitable place of deposit.

46. In combination with a longitudinally disposed box runway of a packing service apparatus, of a plurality of sorting stations arranged in spaced relation at the side of the box runway, each comprising a laterally disposed member arranged at a downward inclination from the box runway, a longitudinally disposed roller arranged adjacent the receiving end of said member, a retaining device situated at the lower end of the downwardly inclined member and in parallelism with the said roller and adapted to cooperate therewith for the holding of a box laterally withdrawn from the box runway at an inclination to the horizontal, and means associated with the sorting stations for receiving empty boxes and returning the same to a place of deposit.

47. The combination with a longitudinally disposed box runway of a packing service apparatus, of means situated therein for intermittently advancing boxes filled with fruit through the runway, a plurality of sorting stations disposed at the side of the runway in spaced relation, each sorting station comprising downwardly inclined members for receiving filled boxes to be sorted from the box runway, longitudinally disposed means situated adjacent the receiving end of the inclined member for the withdrawal of boxes thereover laterally from the box runway, and an endless conveyer common to all of the sorting stations at one side of the box runway for receiving empty boxes and delivering the same to a suitable place of deposit.

48. An apparatus for the described purpose, the same comprising a plurality of stations disposed in spaced longitudinal alignment, means for advancing filled boxes successively to, and bringing the same to a state of rest at the respective stations, a laterally disposed sorting station associated with each of said mentioned stations, anti-frictional devices over which the boxes are withdrawn laterally from the first mentioned stations onto the sorting stations, and means associated with the sorting stations for receiving empty boxes and returning the same to a place of deposit.

49. A packing service apparatus comprising a longitudinally disposed box runway, a plurality of sorting stations arranged in spaced relation at the side of the box runway, means associated with the said runway for advancing boxes therealong in accordance as to whether or not boxes are positioned at the respective sorting stations, and means over which the boxes are withdrawn laterally from the box runway onto the sorting stations.

50. A packing service apparatus comprising a longitudinally disposed runway, a plurality of sorting stations arranged in spaced relation at the side of the runway and each comprising elements for holding a box to be sorted at an inclination to the horizontal, means associated with the box runway for advancing boxes therealong in accordance as to whether or not boxes are positioned at the respective sorting stations, and mechanism associated with the sorting stations for receiving empty boxes therefrom and conveying the same to a place of deposit.

51. A packing service apparatus comprising in combination with a longitudinally disposed box runway, a plurality of sorting stations disposed at the side of the runway in spaced relation and each comprising elements for supporting filled boxes at an incline to the horizontal, means adapted to permit the advance of filled boxes along the runway in accordance as to whether or not a filled box is positioned for removal onto the sorting stations, and means for permitting the lateral withdrawal from the runway onto the sorting stations of filled boxes to be sorted.

52. In combination with the box runway of a packing service apparatus, of a plurality of sorting stations disposed along the side of the runway in spaced relation and each comprising elements adapted for holding a filled box delivered thereto at an inclination to the horizontal, rotatable means associated with the receiving end of each sorting station for permitting the withdrawal thereover of filled boxes laterally from the box runway, and a conveyer for receiving empty boxes from the sorting stations and delivering the same to a suitable place of deposit.

53. In combination with a packing service apparatus, of a box runway provided with means over which boxes are advanced therethrough, a plurality of downwardly inclined sorting stations disposed in spaced relation at the sides of the runway, and means associated with each station for permitting the lateral withdrawal of filled boxes from the runway onto the said sorting stations.

54. In combination with the longitudinally disposed box runway of a packing service apparatus, a plurality of downwardly inclined sorting stations arranged at the side of the runway in spaced relation, means for permitting the advance of filled boxes along the box runway and positioning the same at a state of rest opposite the sorting stations, and means associated with each sorting station over which filled boxes are withdrawn laterally from the runway onto said station.

55. In combination with a longitudinally disposed box runway comprising a plurality of separated stations at which filled boxes automatically are brought to a state of rest, of a downwardly inclined sorting station laterally extended from the said separated stations, rotary means over which filled boxes are laterally withdrawn from the runway onto the sorting stations, and rotatable means for permitting the advance of boxes along the runway in accordance as to whether or not filled boxes are positioned for withdrawal onto the sorting stations.

56. In combination with a longitudinally disposed box runway, a plurality of sorting stations laterally extended from the runway at spaced intervals throughout the length thereof, rotatable means associated with each sorting station over which filled boxes are withdrawn laterally onto the sorting stations, and means within the box runway for permitting the advance of filled boxes thereover in accordance as to whether or not filled boxes are positioned therein for withdrawal onto the sorting stations.

57. In combination with a longitudinally disposed box runway, of a plurality of sorting stations laterally extended therefrom at spaced intervals throughout the length thereof, means associated with each sorting station over which filled boxes are withdrawn laterally from the runway, and means within the runway for permitting the advance of filled boxes thereover in accordance as to whether or not filled boxes are positioned thereon for withdrawal onto the sorting stations.

58. A packing service apparatus comprising a longitudinally disposed frame structure provided with a box runway, a plurality of sorting stations arranged in spaced relation at the side of the frame structure and adapted to receive boxes laterally withdrawn from the box runway, and means within the said runway for permitting the advance of boxes therethrough and bringing the same to a state of rest opposite the respective sorting stations.

59. A packing service apparatus comprising a longitudinally disposed frame structure provided with a box runway, a plurality of sorting stations arranged in spaced relation at the side of the frame structure, and adapted to receive boxes laterally withdrawn from the box runway, and roller means within the said runway for permitting the advance of boxes therethrough and bringing the same to a state of rest opposite the respective sorting stations.

60. A packing service apparatus comprising a longitudinally disposed frame structure provided with a box runway, a plurality of downwardly inclined sorting stations arranged at the side of the box runway in spaced relation, roller means associated with the said runway for permitting the advance of boxes thereover and positioning the same at a state of rest opposite the respective sorting stations, and means associated with each of said stations over which boxes are withdrawn laterally from the runway onto the sorting stations.

61. In combination with a longitudinally disposed runway of a service packing apparatus, of a plurality of downwardly inclined sorting stations arranged at the side of the runway in spaced relation, means associated with each sorting station over which boxes are withdrawn laterally from the box runway, and roller means within the said runway for advancing boxes along the same and positioning the boxes at a state of rest opposite the sorting stations in accordance as to whether boxes are positioned for withdrawal onto said sorting stations.

62. A packing service apparatus comprising a longitudinally disposed runway for filled boxes, a plurality of sorting stations arranged in spaced relation at the side of the box runway, longitudinally disposed means associated with each sorting station for permitting filled boxes to be delivered thereto laterally from the box runway, and means within the runway for positioning filled boxes at a state of rest relative to the sorting stations and at an inclination to the horizontal.

63. A packing service apparatus comprising a box runway, a plurality of sorting stations arranged in spaced relation at the side of the box runway and adapted to receive boxes laterally withdrawn from the box runway, and means within the runway for positioning boxes at rest inclined to the horizontal opposite the respective sorting stations of the apparatus.

64. A packing service apparatus comprising a box runway, a plurality of sorting stations arranged in spaced relation at the side of the box runway and adapted to receive boxes laterally withdrawn therefrom, and roller means within the runway for permitting the advance of boxes therethrough and holding the same at a state of rest inclined to the horizontal opposite the respective sorting stations of the apparatus.

In testimony whereof we have hereunto affixed our signatures to this specification.

McCLELLAN A. KUHN.
FRED STEBLER.